US011973278B2

(12) United States Patent
Ma et al.

(10) Patent No.: US 11,973,278 B2
(45) Date of Patent: Apr. 30, 2024

(54) ANTENNA STRUCTURE AND ELECTRONIC DEVICE

(71) Applicant: Huawei Technologies Co., Ltd., Shenzhen (CN)

(72) Inventors: Ning Ma, Shenzhen (CN); Ben Lai, Wuhan (CN); Xin Pan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 176 days.

(21) Appl. No.: 17/765,113

(22) PCT Filed: Jul. 27, 2020

(86) PCT No.: PCT/CN2020/104911
§ 371 (c)(1),
(2) Date: Mar. 30, 2022

(87) PCT Pub. No.: WO2021/063094
PCT Pub. Date: Apr. 8, 2021

(65) Prior Publication Data

US 2022/0399648 A1 Dec. 15, 2022

(30) Foreign Application Priority Data

Sep. 30, 2019 (CN) ......................... 201910947978.1

(51) Int. Cl.
*H01Q 1/24* (2006.01)
*H01Q 1/48* (2006.01)
*H01Q 9/04* (2006.01)

(52) U.S. Cl.
CPC ............. *H01Q 9/0414* (2013.01); *H01Q 1/48* (2013.01); *H01Q 9/045* (2013.01)

(58) Field of Classification Search
CPC ............ H01Q 1/24; H01Q 1/243; H01Q 1/38; H01Q 1/48; H01Q 21/28; H01Q 9/04;
(Continued)

(56) References Cited

U.S. PATENT DOCUMENTS 9,209,515 B2 * 12/2015 Lin ........................ H01Q 1/084
9,444,128 B2 * 9/2016 Lee ........................ H01Q 21/28
(Continued)

FOREIGN PATENT DOCUMENTS

CN 103259085 A 8/2013
CN 103746192 A 4/2014
(Continued)

*Primary Examiner* — Tho G Phan
(74) *Attorney, Agent, or Firm* — Conley Rose, P.C.

(57) ABSTRACT

An electronic device comprising an antenna structure including a signal reference ground, a first antenna, and a second antenna. The first antenna includes a first radiator and a first feeding line, where the first radiator has a first feeding point, is fed from the first feeding point through the first feeding line, and is electrically coupled to the signal reference ground. The second antenna includes a second radiator and a second feeding line, where the second radiator has a second feeding point and is fed from the second feeding point through the second feeding line, and the second feeding line includes a signal transmission line and a signal reference ground line that is electrically coupled to the first radiator.

20 Claims, 10 Drawing Sheets

(58) Field of Classification Search
CPC .... H01Q 9/0414; H01Q 9/0421; H01Q 9/045; H01Q 1/22; H01Q 1/2258; H01Q 1/242; H01Q 1/36; H01Q 1/44; H01Q 1/50; H01Q 1/52; H01Q 1/521
See application file for complete search history.

(56) References Cited

U.S. PATENT DOCUMENTS

| | | | | |
|---|---|---|---|---|
| 9,509,042 | B1 * | 11/2016 | Zheng | H01Q 1/48 |
| 9,559,408 | B2 * | 1/2017 | Kim | H01Q 1/244 |
| 9,929,463 | B2 * | 3/2018 | Wu | H01Q 1/38 |
| 10,804,607 | B2 * | 10/2020 | Hsieh | H01Q 5/328 |
| 10,819,017 | B2 * | 10/2020 | Gu | H01Q 9/26 |
| 10,978,795 | B2 * | 4/2021 | Chen | H01Q 21/28 |
| 2003/0146872 | A1 | 8/2003 | Kellerman et al. | |
| 2007/0052588 | A1 | 3/2007 | Liu et al. | |
| 2008/0272973 | A1 | 11/2008 | Stutzke | |
| 2018/0358701 | A1 | 12/2018 | Gimersky | |
| 2021/0305703 | A1 | 9/2021 | Li | |
| 2022/0209403 | A1 | 6/2022 | Li et al. | |

FOREIGN PATENT DOCUMENTS

| | | | |
|---|---|---|---|
| CN | 204271252 | U | 4/2015 |
| CN | 106299723 | A | 1/2017 |
| CN | 208127428 | U | 11/2018 |
| CN | 109546311 | A | 3/2019 |
| CN | 110165384 | A | 8/2019 |
| CN | 209282391 | U | 8/2019 |
| CN | 110247160 | A | 9/2019 |

* cited by examiner

-- Prior Art --

ANTENNA STRUCTURE AND ELECTRONIC DEVICE

CROSS-REFERENCE TO RELATED APPLICATIONS

This is a U.S. National Stage of International Patent Application No. PCT/CN2020/104911 filed on Jul. 27, 2020, which claims priority to Chinese Patent Application No. 201910947978.1 filed on Sep. 30, 2019, both of which are hereby incorporated by reference in their entireties.

TECHNICAL FIELD

This application relates to the field of electronic device technologies, and in particular, to an antenna structure and an electronic device.

BACKGROUND

In recent years, with rapid development of wireless communication technologies, there are more frequency band standards for antenna structures in electronic devices such as a mobile phone, a tablet computer, a notebook computer, and a router. To mount these antenna structures in space-limited electronic devices, a plurality of antennas may be integrated to implement spatial multiplexing.

For example, FIG. 1 shows an antenna structure (also referred to as a multi-feedpoint antenna) in the conventional technology. The antenna structure includes a signal reference ground 01, a first antenna 02, and a second antenna 03. The first antenna 02 includes a first radiator, the first radiator has a first feeding point 021, and the first radiator is fed from the first feeding point 021. The second antenna 03 includes a second radiator, the second radiator has a second feeding point 031, and the second radiator is fed from the second feeding point 031. The first radiator and the second radiator are a same radiator (namely, a radiator 04), so that the first antenna 02 and the second antenna 03 are integrated, thereby implementing spatial multiplexing of the antennas. The radiator 04 is electrically connected to the signal reference ground 01 through a conductive connector 05.

The first antenna 02 and the second antenna 03 share the same radiator 04. Therefore, frequency bands of signals fed from the first feeding point 021 and the second feeding point 031 need to be different. If signals of a same frequency band are fed from the first feeding point 021 and the second feeding point 031, isolation between the two signals cannot be ensured. Consequently, the antenna structure shown in FIG. 1 cannot cover two same frequency bands at the same time.

SUMMARY

Embodiments of this application provide an antenna structure and an electronic device, so that the antenna structure can be integrated with two antennas to implement spatial multiplexing, and can cover a same frequency band.

To achieve the foregoing objective, the following technical solutions are used in the embodiments of this application.

According to a first aspect, an embodiment of this application provides an antenna structure. The antenna structure includes a signal reference ground, a first antenna, and a second antenna, where the first antenna includes a first radiator and a first feeding line, the first radiator has a first feeding point, the first radiator is fed from the first feeding point through the first feeding line, one end of the first feeding line is connected to the first feeding point, the other end of the first feeding line is connected to a first feed, and the first radiator is electrically connected to the signal reference ground; and the second antenna includes a second radiator and a second feeding line, the second radiator has a second feeding point, the second radiator is fed from the second feeding point through the second feeding line, one end of the second feeding line is connected to the second feeding point, the other end of the second feeding line is connected to a second feed, the second feeding line includes a signal transmission line and a signal reference ground line, and the signal reference ground line is electrically connected to the first radiator.

In the antenna structure provided in this embodiment of this application, the antenna structure includes the signal reference ground, the first antenna, and the second antenna. The first antenna includes the first radiator and the first feeding line, the first radiator has the first feeding point, the first radiator is fed from the first feeding point through the first feeding line, and the first radiator is electrically connected to the signal reference ground, to use the signal reference ground as a reference ground of the first radiator. The second antenna includes the second radiator and the second feeding line, the second radiator has the second feeding point, the second radiator is fed from the second feeding point through the second feeding line, the second feeding line includes the signal transmission line and the signal reference ground line, and the signal reference ground line is electrically connected to the first radiator. In this way, the first radiator becomes a reference ground of the second radiator. Therefore, the first antenna and the second antenna are integrated. This facilitates reduction of an occupied space of the antenna structure provided in this embodiment of this application, to implement spatial multiplexing. In addition, signals of one or more frequency bands may be transmitted or received through the first antenna, and signals of another or more frequency bands may be transmitted or received through the second antenna. A radiator (namely, the first radiator) of the first antenna is different from a radiator (namely, the second radiator) of the second antenna, and isolation between the first antenna and the second antenna is high. Therefore, a signal frequency band covered by the first antenna may be the same as that covered by the second antenna, so that the antenna structure provided in this embodiment of this application can cover a plurality of same frequency bands at the same time.

With reference to the first aspect, in a first optional implementation of the first aspect, the second radiator is located on one side that is of the first radiator and that is away from the signal reference ground. In this way, the second antenna and the first antenna are stacked, so that an occupied area of an integrated structure of the first antenna and the second antenna on the signal reference ground can be reduced, and more antenna structures can be disposed on the signal reference ground.

With reference to the first optional implementation of the first aspect, in a second optional implementation of the first aspect, the second feed is located on one side that is of the first radiator and that is close to the signal reference ground, a first through hole is provided on the first radiator, the second feeding line penetrates through the first through hole, and the signal reference ground line of the second feeding line is electrically connected to an inner wall of the first through hole. In this way, when the signal reference ground line of the second feeding line is electrically connected to the inner wall of the first through hole, the first radiator is electrically connected to the signal reference ground line. A length of the second feeding line is short. This can save costs, and ensure a clean appearance of the antenna structure.

With reference to the second optional implementation of the first aspect, in a third optional implementation of the first aspect, the second feeding point, the first through hole, and the second feed are arranged in a row. In this way, the length of the second feeding line is the shortest. This can further save the costs, and ensure the clean appearance of the antenna structure.

With reference to the second or third optional implementation of the first aspect, in a fourth optional implementation of the first aspect, the first radiator has a grounding point, the first antenna further includes a conductive connector, the first radiator is electrically connected to the signal reference ground through the conductive connector, one end of the conductive connector is connected to the grounding point, and the other end of the conductive connector is connected to the signal reference ground; and the first through hole is provided at the grounding point, a second through hole is provided on the conductive connector, the second through hole is connected to the first through hole, and the second feeding line penetrates through the first through hole and the second through hole. Because a signal of the first radiator is the weakest at the grounding point, interference to an excitation signal transmitted in the second feeding line is weak, thereby improving the isolation between the first antenna and the second antenna.

With reference to any one of the first to the fourth optional implementations of the first aspect, in a fifth optional implementation of the first aspect, the second antenna further includes a shorting connector, one end of the shorting connector is connected to the second radiator, and the other end of the shorting connector is connected to the first radiator. In this way, the second antenna is of an inverted F-type antenna (inverted F-shaped antenna, IFA) structure or a planar inverted F-type antenna (planar inverted F-shaped antenna, PIFA) structure. The inverted F-type antenna structure and the planar inverted F-type antenna structure each have two resonances. Therefore, the bandwidths are wide. This can improve a bandwidth of the antenna structure provided in this embodiment of this application, and increase a quantity of frequency bands covered by the antenna structure provided in this embodiment of this application.

With reference to the fifth optional implementation of the first aspect, in a sixth optional implementation of the first aspect, a structural shape of the shorting connector may be a block shape, a sheet shape, a line shape, or the like.

With reference to any one of the second to the sixth optional implementations of the first aspect, in a seventh optional implementation of the first aspect, the second radiator is of a metal sheet structure, and the second radiator covers at least a partial area of a surface that is of the first radiator and that is away from the signal reference ground. In this way, the antenna structure provided in this embodiment of this application may have a small size in an arrangement direction of the first radiator and the second radiator. When the antenna is used in an electronic device, a size of the electronic device in the arrangement direction of the first radiator and the second radiator can be reduced.

With reference to any one of the first aspect to the seventh optional implementation of the first aspect, in an eighth optional implementation of the first aspect, the second feeding line is a coaxial line or a microstrip.

With reference to any one of the first aspect to the eighth optional implementation of the first aspect, in a ninth optional implementation of the first aspect, the first feeding line may be a spring, a coaxial line, a microstrip, or the like.

According to a second aspect, an embodiment of this application provides an electronic device. The electronic device includes the antenna structure according to any one of the technical solutions of the first aspect.

Because an antenna structure used in the electronic device in this embodiment of this application is the same as the antenna structure described in any one of the technical solutions of the first aspect, the two can resolve a same technical problem and achieve a same expected effect.

According to a third aspect, an embodiment of this application provides an electronic device. The electronic device includes a printed circuit board, a metal bezel, and an antenna structure. The antenna structure includes a signal reference ground, a first antenna, and a second antenna, where the first antenna includes a first radiator and a first feeding line, the first radiator is at least a part of the metal frame, the first radiator has a first feeding point, the first radiator is fed from the first feeding point through the first feeding line, one end of the first feeding line is connected to the first feeding point, the other end of the first feeding line is connected to a first feed, the signal reference ground is a reference ground layer of the printed circuit board, and the first radiator is electrically connected to the signal reference ground; and the second antenna includes a second radiator and a second feeding line, the second radiator is located on an outer side of the first radiator, an insulation material is filled in a gap between the first radiator and the second radiator, the second radiator has a second feeding point, the second radiator is fed from the second feeding point through the second feeding line, one end of the second feeding line is connected to the second feeding point, the other end of the second feeding line is connected to a second feed, the second feeding line includes a signal transmission line and a signal reference ground line, and the signal reference ground line is electrically connected to the first radiator.

In the antenna structure provided in this embodiment of this application, the antenna structure is used in the electronic device, the electronic device includes the metal bezel, the antenna structure includes the first antenna and the second antenna, the first antenna includes the first radiator and the first feeding line, and the first radiator is the at least part of the metal bezel. In this way, the first antenna is a metal bezel antenna. In addition, the second antenna includes the second radiator and the second feeding line, the second radiator has the second feeding point, the second radiator is fed from the second feeding point through the second feeding line, the second feeding line includes the signal transmission line and the signal reference ground line, and the signal reference ground line is electrically connected to the first radiator. In this way, the first radiator becomes a reference ground of the second radiator. Therefore, the first antenna and the second antenna are integrated. This facilitates reduction of an occupied space of the antenna structure provided in this embodiment of this application, to implement spatial multiplexing. In addition, signals of one or more frequency bands may be transmitted or received through the first antenna, and signals of another or more frequency bands may be transmitted or received through the second antenna. A radiator (namely, the first radiator) of the first antenna is different from a radiator (namely, the second radiator) of the second antenna, and isolation between the first antenna and the second antenna is high. Therefore, a signal frequency band covered by the first antenna may be the same as that covered by the second antenna, so that the antenna structure provided in this embodiment of this application can cover a plurality of same frequency bands at the same time.

With reference to the third aspect, in a first optional implementation of the third aspect, the second feed is located on one side that is of the first radiator and that is close to the signal reference ground, a first through hole is provided on the first radiator, the second feeding line penetrates through the first through hole, and the signal reference ground line of the second feeding line is electrically connected to an inner wall of the first through hole. In this way, when the signal reference ground line of the second feeding line is electrically connected to the inner wall of the first through hole, the first radiator is electrically connected to the signal reference ground line. A length of the second feeding line is short. This can save costs, and ensure a clean appearance of the antenna structure.

With reference to the first optional implementation of the third aspect, in a second optional implementation of the third aspect, the second feeding point, the first through hole, and the second feed are arranged in a row. In this way, the length of the second feeding line is the shortest. This can further save the costs, and ensure the clean appearance of the antenna structure.

With reference to the first or second optional implementation of the third aspect, in a third optional implementation of the third aspect, the first radiator has a grounding point, the first antenna further includes a conductive connector, the first radiator is electrically connected to the reference ground layer of the printed circuit board through the conductive connector, one end of the conductive connector is connected to the grounding point, and the other end of the conductive connector is connected to the signal reference ground; and the first through hole is provided at the grounding point, a second through hole is provided on the conductive connector, the second through hole is connected to the first through hole, and the second feeding line penetrates through the first through hole and the second through hole. Because a signal of the first radiator is the weakest at the grounding point, interference to an excitation signal transmitted in the second feeding line is weak, thereby improving the isolation between the first antenna and the second antenna.

With reference to any one of the third aspect to the third optional implementation of the third aspect, in a fourth optional implementation of the third aspect, the second antenna further includes a shorting connector, one end of the shorting connector is connected to the second radiator, and the other end of the shorting connector is connected to the first radiator. In this way, the second antenna is of an inverted F-type antenna (inverted F-shaped antenna, IFA) structure or a planar inverted F-type antenna (planar inverted F-shaped antenna, PIFA) structure. The inverted F-type antenna structure and the planar inverted F-type antenna structure each have two resonances. Therefore, bandwidths of the inverted F-type antenna structure and the planar inverted F-type antenna structure are large. This can improve a bandwidth of the antenna structure provided in this embodiment of this application, and increase a quantity of frequency bands covered by the antenna structure provided in this embodiment of this application.

With reference to the fourth optional implementation of the third aspect, in a fifth optional implementation of the third aspect, a structural shape of the shorting connector may be a block shape, a sheet shape, a line shape, or the like.

With reference to any one of the third aspect to the fifth optional implementation of the third aspect, in a sixth optional implementation of the third aspect, the second radiator is of a metal sheet structure, and the second radiator covers at least a partial area of an outer surface of the first radiator. In this way, the antenna structure provided in this embodiment of this application may have a small size in a thickness direction of the metal bezel. When the antenna is used in the electronic device, a bezel thickness of the electronic device can be reduced.

With reference to the sixth optional implementation of the third aspect, in a seventh optional implementation of the third aspect, a spacing between the second radiator and the first radiator is 0 mm to 0.2 mm. In this way, a distance between the second radiator and the first radiator is close, and the second radiator can be packaged in a coating on the outer side of the first radiator.

With reference to any one of the third aspect to the seventh optional implementation of the third aspect, in an eighth optional implementation of the third aspect, the second feeding line is a coaxial line or a microstrip.

With reference to any one of the third aspect to the eighth optional implementation of the third aspect, in a ninth optional implementation of the third aspect, the first feeding line may be a spring, a coaxial line, a microstrip, or the like.

A SECOND BRIEF DESCRIPTION OF DRAWINGS

DESCRIPTION OF EMBODIMENTS

The terms “first” and “second” in the embodiments of this application are merely intended for a purpose of description, and shall not be understood as an indication or implication of relative importance or implicit indication of a quantity of indicated technical features. Therefore, a feature limited by “first” or “second” may explicitly or implicitly include one or more features.

In this embodiment of this application, it should be noted that the term “electrical connection” should be understood broadly. For example, current conduction may be implemented through direct connection, or electric energy conduction may be implemented through capacitive coupling.

Figure 1:
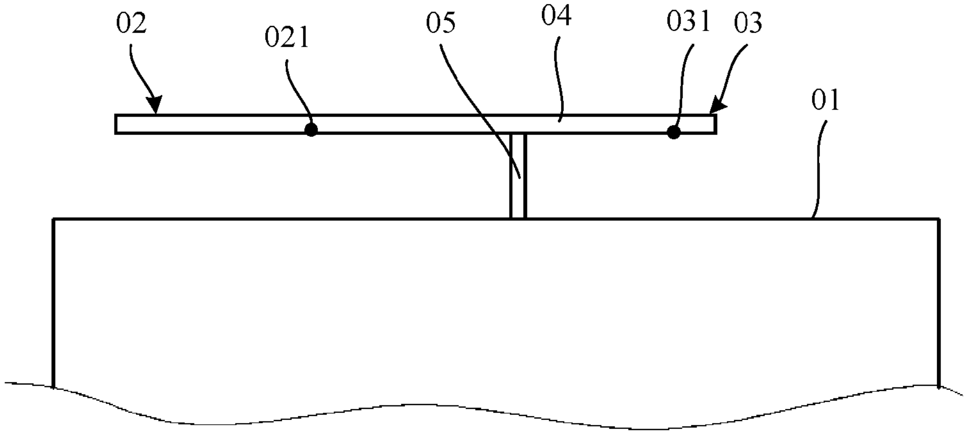
FIG. 1 is a schematic diagram of an antenna structure according to the conventional technology.
Figure 2:
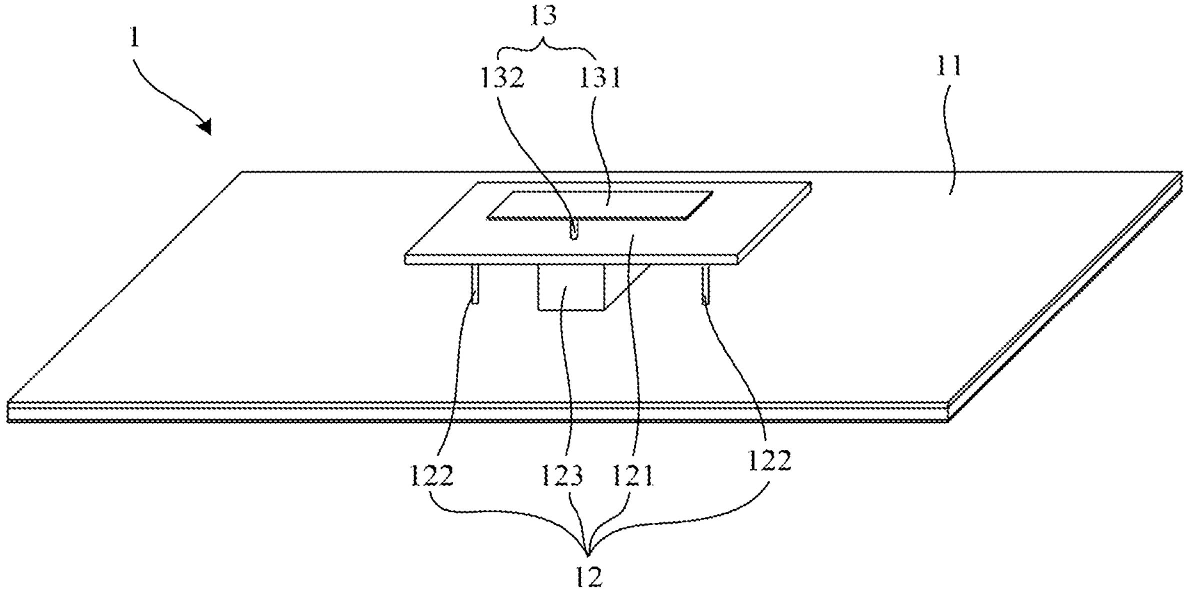
FIG. 2 is a perspective view of a first antenna structure according to an embodiment of this application.
Figure 3:
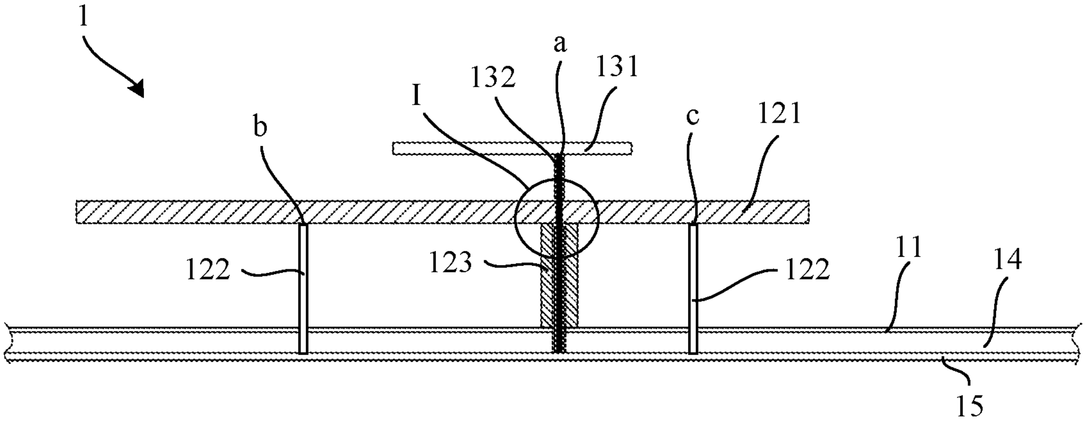
FIG. 3 is a schematic diagram of a cross-sectional structure of the antenna structure shown in FIG. 2.
Figure 4:
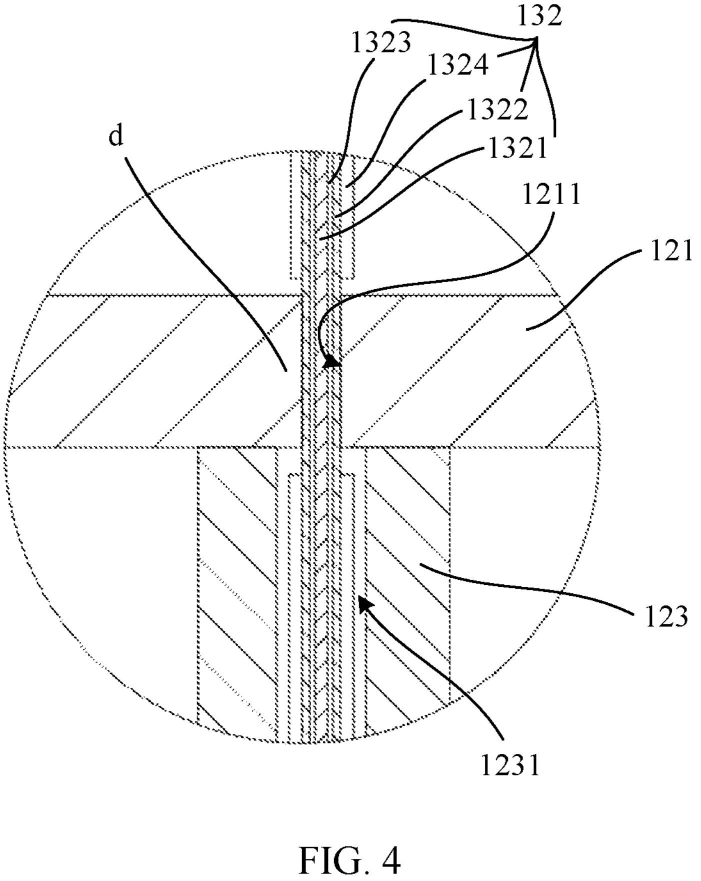
FIG. 4 is an enlarged view of an area I in FIG. 3.

An embodiment of this application provides an electronic device. The electronic device includes an antenna structure 1. As shown in FIG. 2, the antenna structure 1 includes a signal reference ground 11, a first antenna 12, and a second antenna 13. The first antenna 12 includes a first radiator 121 and a first feeding line 122. As shown in FIG. 3, the first radiator 121 has a first feeding point, the first radiator 121 is fed from the first feeding point through the first feeding line 122, one end of the first feeding line 122 is connected to the first feeding point, the other end of the first feeding line 122 is connected to a first feed (not shown in the figure), and the first radiator 121 is electrically connected to the signal reference ground 11. The second antenna 13 includes a second radiator 131 and a second feeding line 132. As shown in FIG. 3, the second radiator 131 has a second feeding point a, the second radiator 131 is fed from the second feeding point through the second feeding line 132, one end of the second feeding line 132 is connected to the second feeding point, and the other end of the second feeding line 132 is connected to a second feed (not shown in the figure). As shown in FIG. 4, the second feeding line 132 includes a signal transmission line 1321 and a signal reference ground line 1322, and the signal reference ground line 1322 is electrically connected to the first radiator 121.

In this embodiment, the second radiator 131 is fed from the second feeding point through the second feeding line 132, and a fed electrical signal is transmitted in the signal transmission line 1321 of the second feeding line 132. In this way, that one end of the second feeding line 132 is connected to the second feeding point specifically means that the signal transmission line 1321 of the second feeding line 132 is connected to the second feeding point.

It should be noted that, to make the first radiator 121 and the second radiator 131 different radiators, the first radiator 121 needs to be spaced from the second radiator 131, that is, the first radiator 121 and the second radiator 131 are not in contact with each other. In this way, the first radiator 121 and the second radiator 131 are independent of each other, to ensure high isolation between the first antenna 12 and the second antenna 13. Under this condition, the second radiator 131 and the first radiator 121 may be arranged side by side, may be stacked, or may be in another relative position relationship. This is not specifically limited herein.

In the antenna structure provided in this embodiment of this application, as shown in FIG. 2 and FIG. 3, the antenna structure 1 includes the signal reference ground 11, the first antenna 12, and the second antenna 13. The first antenna 12 includes the first radiator 121 and the first feeding line 122, the first radiator 121 has the first feeding point, the first radiator 121 is fed from the first feeding point through the first feeding line 122, and the first radiator 121 is electrically connected to the signal reference ground 11, to use the signal reference ground 11 as a reference ground of the first radiator 121. The second antenna 13 includes the second radiator 131 and the second feeding line 132, the second radiator 131 has the second feeding point, and the second radiator 131 is fed from the second feeding point through the second feeding line 132. As shown in FIG. 4, the second feeding line 132 includes the signal transmission line 1321 and the signal reference ground line 1322, and the signal reference ground line 1322 is electrically connected to the first radiator 121. In this way, the first radiator 121 becomes a reference ground of the second radiator 131. Therefore, the first antenna 12 and the second antenna 13 are integrated. This facilitates reduction of an occupied space of the antenna structure 1 provided in this embodiment of this application, to implement spatial multiplexing. In addition, signals of one or more frequency bands may be transmitted or received through the first antenna 12, and signals of another or more frequency bands may be transmitted or received through the second antenna 13. A radiator (namely, the first radiator 121) of the first antenna 12 is different from a radiator (namely, the second radiator 131) of the second antenna 13, and isolation between the first antenna 12 and the second antenna 13 is high. Therefore, a signal frequency band covered by the first antenna 12 may be the same as that covered by the second antenna 13, so that the antenna structure 1 provided in this embodiment of this application can cover a plurality of same frequency bands at the same time.

Because the antenna structure 1 used in the electronic device in this embodiment of this application is the same as the antenna structure 1 described in this embodiment, the two can resolve a same technical problem and achieve a same expected effect.

The electronic device provided in this embodiment of this application may be an active antenna module, a router, a mobile phone, a notebook computer, or the like.

The first radiator 121 and the second radiator 131 may be in a strip shape, a block shape, a plate shape, a sheet shape, or the like. This is not specifically limited herein.

The signal reference ground 11 may be a separate metal plate, or may be a metal layer disposed on a printed circuit board (printed circuit board, PCB). This is not specifically limited herein. In some embodiments, as shown in FIG. 3, the antenna structure 1 further includes a printed circuit board 14, the signal reference ground 11 is a metal layer disposed on one surface of the printed circuit board 14, the first feed and the second feed are included in a metal layer 15, and the metal layer 15 is disposed on another surface of the printed circuit board 14.

In addition to being of a line-shaped structure, for example, a coaxial line or a microstrip, the first feeding line 122 may alternatively be a spring or a protrusion. This is not specifically limited herein.

A structure of the second feeding line 132 is a structure that has the signal transmission line 1321 and the signal reference ground line 1322, for example, a coaxial line or a microstrip. In some embodiments, as shown in FIG. 4, the second feeding line 132 is a coaxial line. The coaxial line includes an inner conductor and an insulation layer 1323, an outer conductor, and a cladding 1324 that are successively wrapped around the inner conductor. The inner conductor is the signal transmission line 1321, and the outer conductor is the signal reference ground line 1322. In some other embodiments, the second feeding line 132 is a microstrip. The microstrip includes a dielectric substrate, a microwave transmission line layer, and a reference ground layer. The microwave transmission line layer is disposed on one surface of the dielectric substrate, the reference ground layer is disposed on another surface of the dielectric substrate, the microwave transmission line layer is the signal transmission line 1321, and the reference ground layer is the signal reference ground line 1322.

There may be one or more first feeding points. This is not specifically limited herein. When there is one first feeding point, the first antenna 12 is a single-feedpoint antenna, and can cover one frequency band. When there is a plurality of first feeding points, the first antenna 12 is a multi-feedpoint antenna, and can cover a plurality of frequency bands. For example, as shown in FIG. 3, there are two first feeding points on the first radiator 121. The two first feeding points are respectively a first feeding point b and a first feeding point c. In this way, the first antenna 12 is a dual-feedpoint antenna, and is separately fed by two first feeding lines 122, so that two different frequency bands can be covered.

Similarly, there may be one or more second feeding points. This is not specifically limited herein. When there is one second feeding point, the second antenna 13 is a single-feedpoint antenna, and can cover one frequency band. When there is a plurality of second feeding points, the second antenna 13 is a multi-feedpoint antenna, and can cover a plurality of frequency bands. For example, as shown in FIG. 3, there is one second feeding point on the second radiator 131. The second feeding point is a second feeding point a. In this way, the second antenna 13 is a single-feedpoint antenna, and can cover one frequency band. The frequency band may be the same as a frequency band of a signal fed from the first feeding point b, may be the same as a frequency band of a signal fed from the first feeding point c, or may be different from both the frequency band of the signal fed from the first feeding point b and the frequency band of the signal fed from the first feeding point c. This is not specifically limited herein.

In some embodiments, as shown in FIG. 2 and FIG. 3, the second radiator 131 is located on one side that is of the first radiator 121 and that is away from the signal reference ground 11. In this way, the second antenna 13 and the first antenna 12 are stacked, so that an occupied area of an integrated structure of the first antenna 12 and the second antenna 13 on the signal reference ground 11 can be reduced, and more antenna structures can be disposed on the signal reference ground 11.

In some embodiments, the second feed is located on one side that is of the first radiator 121 and that is close to the signal reference ground 11. As shown in FIG. 4, a first through hole 1211 is provided on the first radiator 121, the second feeding line 132 penetrates through the first through hole 1211, and the signal reference ground line 1322 of the second feeding line 132 is electrically connected to an inner wall of the first through hole 1211. In this way, when the signal reference ground line 1322 of the second feeding line 132 is electrically connected to the inner wall of the first through hole 1211, the first radiator 121 is electrically connected to the signal reference ground line 1322. A length of the second feeding line 132 is short. This can save costs, and ensure a clean appearance of the antenna structure 1.

In this embodiment, when the second feeding line 132 is a coaxial line, to electrically connect the signal reference ground line 1322 of the second feeding line 132 and the inner wall of the first through hole 1211, as shown in FIG. 4, a part that is of the second feeding line 132 and that penetrates through the first through hole 1211 should not include the cladding 1324, to expose the signal reference ground line 1322 (namely, the outer conductor), thereby electrically connecting the outer conductor and the inner wall of the first through hole 1211.

In some embodiments, the second feeding point a, the first through hole 1211, and the second feed are arranged in a row. In this way, the length of the second feeding line 132 is the shortest. This can further save the costs, and ensure the clean appearance of the antenna structure 1.

In some embodiments, as shown in FIG. 2 and FIG. 3, the first radiator 121 has a grounding point, the first antenna 12 further includes a conductive connector 123, the first radiator 121 is electrically connected to the signal reference ground 11 through the conductive connector 123, one end of the conductive connector 123 is connected to the grounding point, and the other end of the conductive connector 123 is connected to the signal reference ground 11. As shown in FIG. 4, the first through hole 1211 is provided at the grounding point d, a second through hole 1231 is provided on the conductive connector 123, the second through hole 1231 is connected to the first through hole 1211, and the second feeding line 132 penetrates through the first through hole 1211 and the second through hole 1231. Because a signal of the first radiator 121 is the weakest at the grounding point d, interference to an excitation signal transmitted in the second feeding line 132 is weak, thereby improving the isolation between the first antenna 12 and the second antenna 13.

Figure 5:
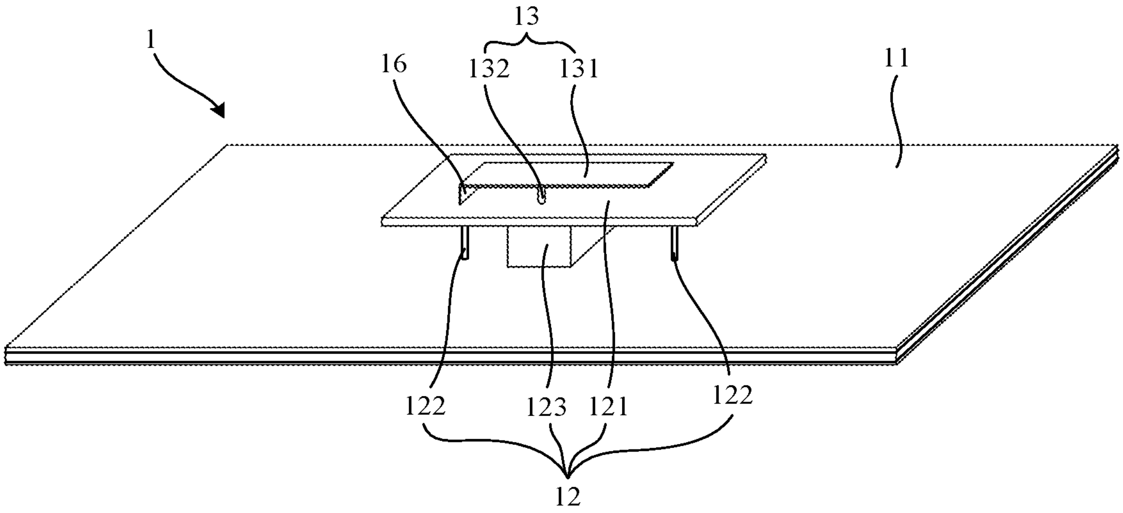
FIG. 5 is a perspective view of a second antenna structure according to an embodiment of this application.
Figure 6:
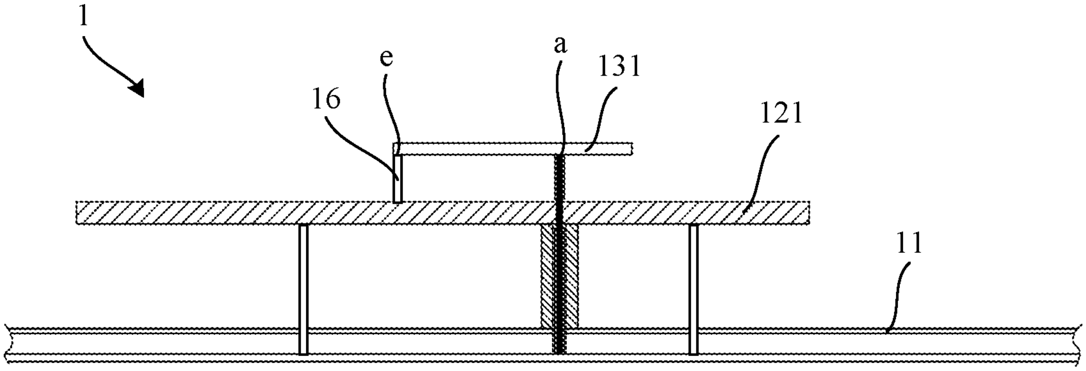
FIG. 6 is a schematic diagram of a cross-sectional structure of the antenna structure shown in FIG. 5.

In some embodiments, as shown in FIG. 5 and FIG. 6, the second antenna 13 further includes a shorting connector 16, one end of the shorting connector 16 is connected to the second radiator 131, and the other end of the shorting connector 16 is connected to the first radiator 121. In this way, the second antenna 13 is of an inverted F-type antenna (inverted F-shaped antenna, IFA) structure or a planar inverted F-type antenna (planar inverted F-shaped antenna, PIFA) structure. The inverted F-type antenna structure and the planar inverted F-type antenna structure each have two resonances. Therefore, bandwidths of the inverted F-type antenna structure and the planar inverted F-type antenna structure are large. This can improve a bandwidth of the antenna structure 1 provided in this embodiment of this application, and increase a quantity of frequency bands covered by the antenna structure 1 provided in this embodiment of this application.

It should be noted that as shown in FIG. 6, a position that is on the second radiator 131 and that is connected to the shorting connector 16 is a shorting point e. A distance between the shorting point e and the second feeding point a affects a distance between the two resonance frequencies of the second antenna 13. A larger distance between the shorting point e and the second feeding point a indicates a larger distance between the two resonance frequencies of the second antenna 13. In this way, the two resonance frequencies of the second antenna 13 may be respectively located at a first preset frequency and a second preset frequency through reasonable designs of the shorting point e, the second feeding point a, and the distance between the shorting point e and the second feeding point a. It should be noted that when the position that is on the second radiator 131 and that is connected to the shorting connector 16 is an area, the shorting point is a center of the area.

A structural shape of the shorting connector 16 may be a block shape, a sheet shape, a line shape, or the like. In some embodiments, as shown in FIG. 5, the shorting connector 16 is in a sheet shape.

In some embodiments, as shown in FIG. 2 and FIG. 3, the second radiator 131 is of a metal sheet structure, and the second radiator 131 covers at least a partial area of a surface that is of the first radiator 121 and that is away from the signal reference ground 11. In this way, the antenna structure 1 provided in this embodiment of this application may have a small size in an arrangement direction of the first radiator 121 and the second radiator 131. When the antenna is used in the electronic device, a size of the electronic device in the arrangement direction of the first radiator 121 and the second radiator 131 can be reduced.

In this embodiment, the second radiator 131 covers the at least partial area of the surface that is of the first radiator 121 and that is away from the signal reference ground 11, that is, the second radiator 131 is parallel to or approximately parallel to the at least partial area of the surface that is of the first radiator 121 and that is away from the signal reference ground 11. The second radiator 131 covers the at least partial area of the surface that is of the first radiator 121 and that is away from the signal reference ground 11. Specifically, the second radiator 221 may cover the entire surface that is of the first radiator 121 and that is away from the signal reference ground 11, or may cover a partial area of the surface that is of the first radiator 121 and that is away from the signal reference ground 11.

Figure 7:
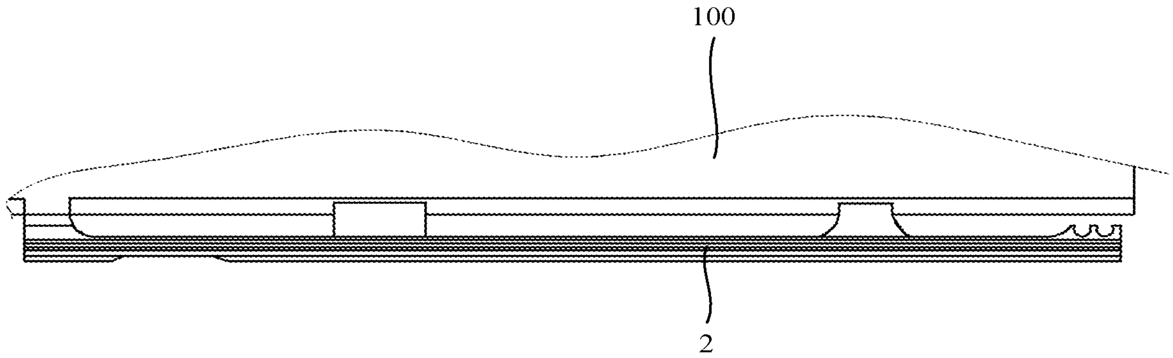
FIG. 7 is a schematic diagram of a structure of an electronic device according to an embodiment of this application.
Figure 8:
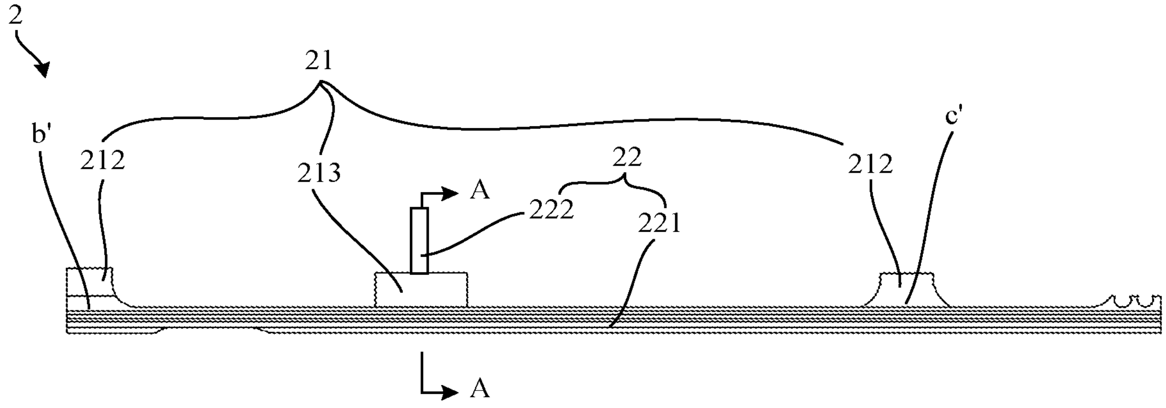
FIG. 8 is a schematic diagram of a third antenna structure according to an embodiment of this application.
Figure 9:
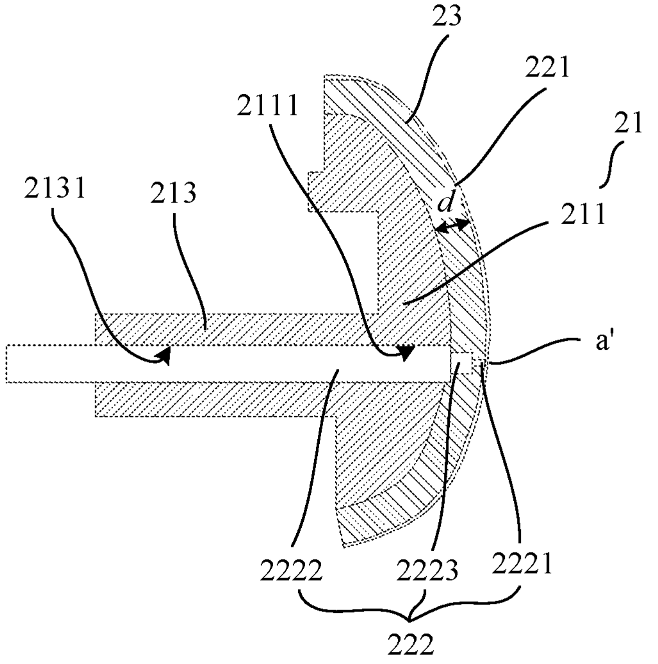
FIG. 9 is a schematic diagram of a cross-sectional structure of the antenna structure shown in FIG. 8 along A-A.

An embodiment of this application further provides an electronic device. As shown in FIG. 7, the electronic device includes a metal bezel, a printed circuit board 100, and an antenna structure 2. As shown in FIG. 8 and FIG. 9, the antenna structure 2 includes: a signal reference ground, a first antenna 21, and a second antenna 22. The first antenna 21 includes a first radiator 211 (shown in FIG. 9) and a first feeding line 212 (shown in FIG. 8). The first radiator 211 is at least a part of the metal bezel. As shown in FIG. 8, the first radiator 211 has a first feeding point, the first radiator 211 is fed from the first feeding point through the first feeding line 212, one end of the first feeding line 212 is connected to the first feeding point, the other end of the first feeding line 212 is connected to a first feed, the signal reference ground is a reference ground layer of the printed circuit board 100, and the first radiator 211 is electrically connected to the signal reference ground. The second antenna 22 includes a second radiator 221 and a second feeding line 222. The second radiator 221 has a second feeding point, the second radiator 221 is fed from the second feeding point through the second feeding line 222, one end of the second feeding line 222 is connected to the second feeding point, the other end of the second feeding line 222 is connected to a second feed, the second feeding line 222 includes a signal transmission line 2221 and a signal reference ground line 2222, and the signal reference ground line 2222 is electrically connected to the first radiator 211.

In this embodiment, the second radiator 221 is fed from the second feeding point through the second feeding line 222, and a fed electrical signal is transmitted in the signal transmission line 2221 of the second feeding line 222. In this way, that one end of the second feeding line 222 is connected to the second feeding point specifically means that the signal transmission line 2221 of the second feeding line 222 is connected to the second feeding point.

It should be noted that, to make the first radiator 211 and the second radiator 221 different radiators, the first radiator 211 needs to be spaced from the second radiator 221, that is, the first radiator 211 and the second radiator 221 are not in contact with each other. In this way, the first radiator 211 and the second radiator 221 are independent of each other, so that high isolation between the first antenna 21 and the second antenna 22 can be ensured. Under this condition, the second radiator 221 and the first radiator 211 may be arranged side by side, may be stacked, or may be in another relative position relationship. This is not specifically limited herein.

In the electronic device provided in this embodiment of this application, the electronic device includes the antenna structure 2. As shown in FIG. 8 and FIG. 9, the antenna structure 2 includes the first antenna 21 and the second antenna 22, the first antenna 21 includes the first radiator 211 and the first feeding line 212, and the first radiator 211 is the at least part of the metal bezel. In this way, the first antenna 21 is a metal bezel antenna. In addition, the second antenna 22 includes the second radiator 221 and the second feeding line 222, the second radiator 221 has the second feeding point, the second radiator 221 is fed from the second feeding point through the second feeding line 222, the second feeding line 222 includes the signal transmission line 2221 and the signal reference ground line 2222, and the signal reference ground line 2222 is electrically connected to the first radiator 211. In this way, the first radiator 211 becomes a reference ground of the second radiator 221. Therefore, the first antenna 21 and the second antenna 22 are integrated. This facilitates reduction of an occupied space of the antenna structure 2 provided in this embodiment of this application, to implement spatial multiplexing. In addition, signals of one or more frequency bands may be transmitted or received through the first antenna 21, and signals of another or more frequency bands may be transmitted or received through the second antenna 22. A radiator (namely, the first radiator 211) of the first antenna 21 is different from a radiator (namely, the second radiator 221) of the second antenna 22, and isolation between the first antenna 21 and the second antenna 22 is high. Therefore, a signal frequency band covered by the first antenna 21 may be the same as that covered by the second antenna 22, so that the antenna structure 2 provided in this embodiment of this application can cover a plurality of same frequency bands at the same time.

The electronic device provided in this embodiment of this application may be a mobile phone, a tablet computer, a notebook computer, or the like.

That the first radiator 211 is at least a part of the metal bezel means that the first radiator 211 may be a part of the metal bezel, for example, may be a segment of the metal bezel along a length direction of the metal bezel, or may be the entire metal bezel.

The second radiator 221 may be in a strip shape, a block shape, a plate shape, a sheet shape, or the like. This is not specifically limited herein.

In addition to including the reference ground layer, the printed circuit board 100 further includes a dielectric substrate. The reference ground layer is generally disposed on one surface of the dielectric substrate, and the first feed and the second feed are disposed on another surface of the dielectric substrate.

In addition to being of a line-shaped structure, for example, a coaxial line or a microstrip, the first feeding line 212 may alternatively be a spring or a protrusion. This is not specifically limited herein. In some embodiments, as shown in FIG. 8, the first feeding line 212 is a protrusion.

A structure of the second feeding line 222 is a structure that has the signal transmission line 2221 and the signal reference ground line 2222, for example, a coaxial line or a microstrip. In some embodiments, as shown in FIG. 9, the second feeding line 222 is a coaxial line. The coaxial line includes an inner conductor and an insulation layer 2223, an outer conductor, and a cladding that are successively wrapped around the inner conductor, where the inner conductor is the signal transmission line 2221, and the outer conductor is the signal reference ground line 2222. In some other embodiments, the second feeding line 222 is a microstrip. The microstrip includes a dielectric substrate, a microwave transmission line layer, and a reference ground layer. The microwave transmission line layer is disposed on one surface of the dielectric substrate, the reference ground layer is disposed on another surface of the dielectric substrate, the microwave transmission line layer is the signal transmission line 2221, and the reference ground layer is the signal reference ground line 2222.

There may be one or more first feeding points. This is not specifically limited herein. When there is one first feeding point, the first antenna 21 is a single-feedpoint antenna, and can cover one frequency band. When there is a plurality of first feeding points, the first antenna 21 is a multi-feedpoint antenna, and can cover a plurality of frequency bands. For example, as shown in FIG. 8, there are two first feeding points on the first radiator 211. The two first feeding points are respectively a first feeding point b' and a first feeding point c'. In this way, the first antenna 21 is a dual-feedpoint antenna, and is fed by two first feeding lines 212, so that two different frequency bands can be covered.

Similarly, there may be one or more second feeding points. This is not specifically limited herein. When there is one second feeding point, the second antenna 22 is a single-feedpoint antenna, and can cover one frequency band. When there is a plurality of second feeding points, the second antenna 22 is a multi-feedpoint antenna, and can cover a plurality of frequency bands. For example, as shown in FIG. 9, there is one second feeding point on the second radiator 221. The second feeding point is a second feeding point a'. In this way, the second antenna 22 is a single-feedpoint antenna, and can cover one frequency band. The frequency band may be the same as a frequency band of a signal fed from the first feeding point b', may be the same as a frequency band of a signal fed from the first feeding point c', or may be different from both the frequency band of the signal fed from the first feeding point b' and the frequency band of the signal fed from the first feeding point c'. This is not specifically limited herein.

In some embodiments, as shown in FIG. 9, the second radiator 221 is located on an outer side of the first radiator 211. In this way, the second antenna 22 and the first antenna 21 are stacked, so that an occupied space of the integrated antenna structure 2 of the first antenna 21 and the second antenna 22 on the metal bezel can be reduced, and more antenna structures can be disposed on the metal bezel.

It should be noted that because the first radiator 211 is the at least part of the metal bezel, the outer side of the first radiator 211 is one side away from an internal space of a housing of the electronic device when the at least part of the metal bezel is used in the electronic device.

In some embodiments, the second feed is located on one side that is of the first radiator 211 and that is close to the signal reference ground. As shown in FIG. 9, a first through hole 2111 is provided on the first radiator 211, the second feeding line 222 penetrates through the first through hole 2111, and the signal reference ground line 2222 of the second feeding line 222 is electrically connected to an inner wall of the first through hole 2111. In this way, when the signal reference ground line 2222 of the second feeding line 222 is electrically connected to the inner wall of the first through hole 2111, the first radiator 211 is electrically connected to the signal reference ground line 2222. A length of the second feeding line 222 is short. This can save costs, and ensure a clean appearance of the antenna structure 2.

In this embodiment, when the second feeding line 222 is a coaxial line, to electrically connect the signal reference ground line 2222 of the second feeding line 222 and the inner wall of the first through hole 2111, as shown in FIG. 9, a part that is of the second feeding line 222 and that penetrates through the first through hole 2111 should not include the cladding, to expose the signal reference ground line 2222 (namely, the outer conductor), thereby electrically connecting the outer conductor and the inner wall of the first through hole 2111.

In some embodiments, the second feeding point, the first through hole 2111, and the second feed are arranged in a row. In this way, the length of the second feeding line 222 is the shortest. This can further save the costs, and ensure the clean appearance of the antenna structure 2.

In some embodiments, the first radiator 211 has a grounding point. As shown in FIG. 8 and FIG. 9, the first antenna 21 further includes a conductive connector 213, the first radiator 211 is electrically connected to the reference ground layer of the printed circuit board 100 through the conductive connector 213, one end of the conductive connector 213 is connected to the grounding point, and the other end of the conductive connector 213 is connected to the reference ground layer of the printed circuit board 100. The first through hole 2111 is provided at the grounding point, a second through hole 2131 is provided on the conductive connector 213, the second through hole 2131 is connected to the first through hole 2111, and the second feeding line 222 penetrates through the first through hole 2111 and the second through hole 2131. Because a signal of the first radiator 211 is the weakest at the grounding point, interference to an excitation signal transmitted in the second feeding line 222 is weak, thereby improving the isolation between the first antenna 21 and the second antenna 22.

Figure 13:
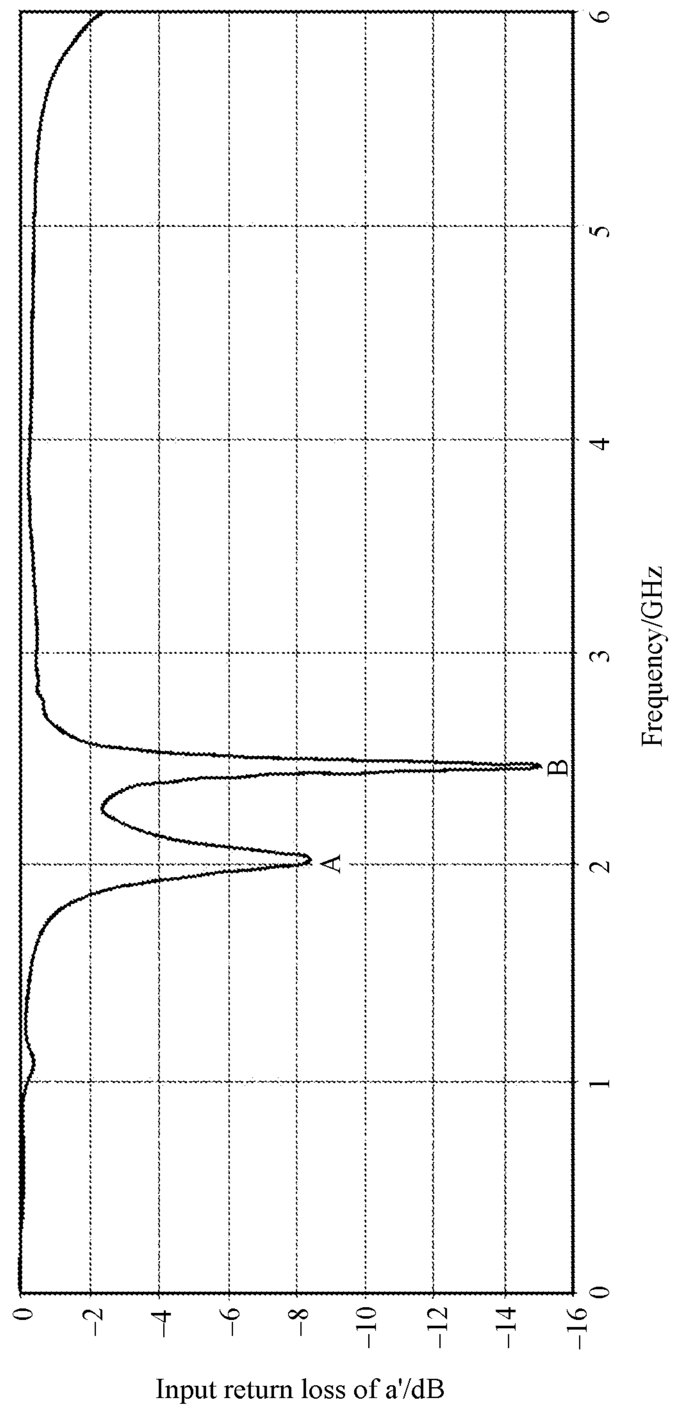
FIG. 13 shows an input return loss of a second feeding point a' in the antenna structure (not including a shorting connector) shown in FIG. 9 within a frequency band of 0 GHz to 6 GHz.
Figure 14:
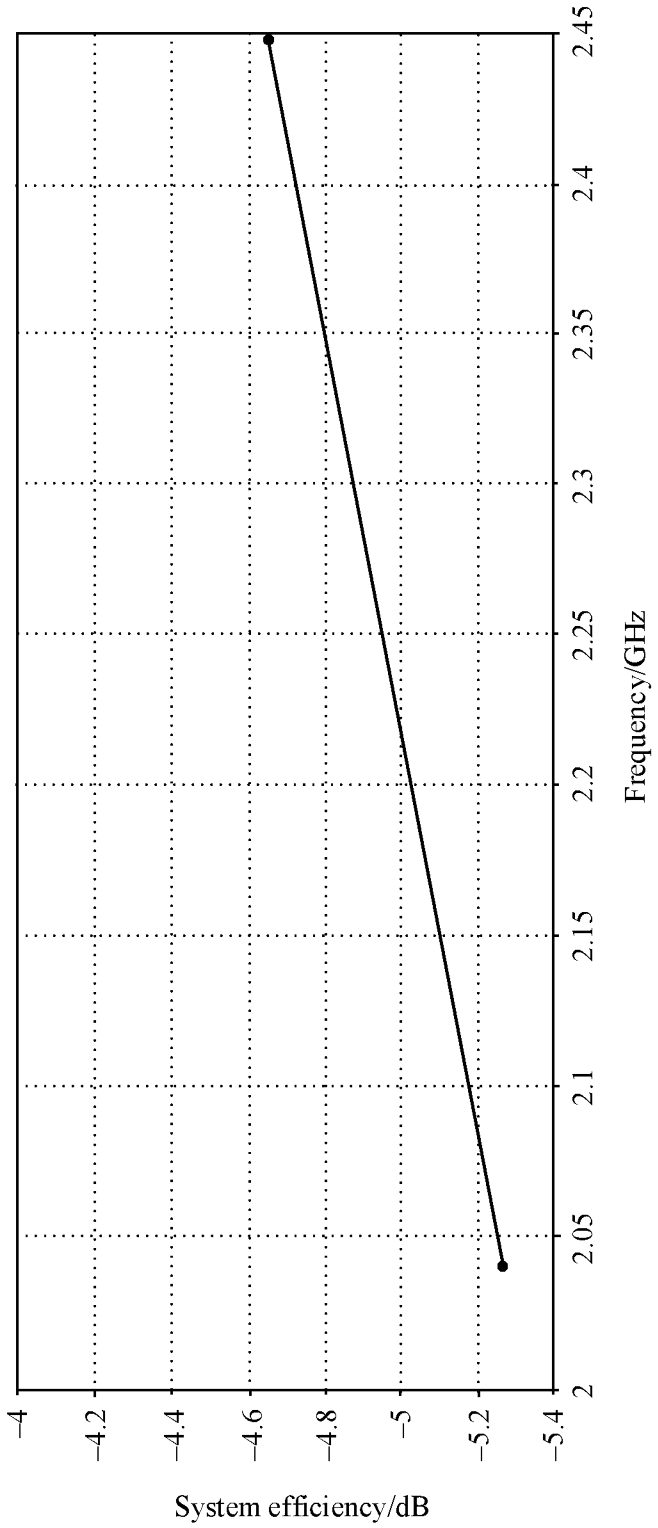
FIG. 14 shows system efficiency of a second antenna in the antenna structure (not including a shorting connector) shown in FIG. 9 within a frequency band of 2 GHz to 2.45 GHz.

In some embodiments, the second antenna 22 further includes a shorting connector (not shown in the figure), one end of the shorting connector is connected to the second radiator 221, and the other end of the shorting connector is connected to the first radiator 211. In this way, the second antenna 22 is of an inverted F-type antenna (inverted F-shaped antenna, IFA) structure or a planar inverted F-type antenna (planar inverted F-shaped antenna, PIFA) structure. An input return loss of the second feeding point a' in the antenna structure 2 (including the shorting connector) shown in FIG. 8 and FIG. 9 within a frequency band of 0 GHz to 6 GHz is simulated, and a result is recorded in FIG. 13. As shown in FIG. 13, the inverted F-type antenna structure or the planar inverted F-type antenna structure has two resonance frequencies (which are respectively a resonance frequency A and a resonance frequency B). Therefore, a bandwidth of the inverted F-type antenna structure or the planar inverted F-type antenna structure is large. This can improve a bandwidth of the antenna structure 2 provided in this embodiment of this application, and increase a quantity of frequency bands covered by the antenna structure 2 provided in this embodiment of this application. System efficiency of the second antenna in the antenna structure 2 (including the shorting connector) shown in FIG. 8 and FIG. 9 within a frequency band of 2 GHz to 2.45 GHz is simulated, and a result is recorded in FIG. 14. As shown in FIG. 14, the system efficiency of the second antenna within the frequency band of 2 GHz to 2.45 GHz is greater than −5.3 dB. The system efficiency is high, and can be used to transmit or receive a signal.

It should be noted that a position that is on the second radiator 221 and that is connected to the shorting connector is a shorting point. A distance between the shorting point and the second feeding point a' affects a distance between the two resonance frequencies of the second antenna 22. A larger distance between the shorting point and the second feeding point a' indicates a larger distance between the two resonance frequencies of the second antenna 22. In this way, the two resonance frequencies of the second antenna 22 may be respectively located at a first preset frequency and a second preset frequency through reasonable designs of the shorting point, the second feeding point a', and the distance between the shorting point and the second feeding point a'. It should be noted that when the position that is on the second radiator 221 and that is connected to the shorting connector is an area, the shorting point is a center of the area.

A structural shape of the shorting connector may be a block shape, a sheet shape, a line shape, or the like. In some embodiments, the shorting connector is in a sheet shape.

In some embodiments, as shown in FIG. 9, the second radiator 221 is of a metal sheet structure, and the second radiator 221 covers at least a partial area of an outer surface of the first radiator 211. In this way, the antenna structure 2 provided in this embodiment of this application may have a small size in a thickness direction of the metal bezel. When the antenna is used in the electronic device, a bezel thickness of the electronic device can be reduced.

In this embodiment, the second radiator 221 covers the at least partial area of the outer surface of the first radiator 211, that is, the second radiator 221 is parallel to or approximately parallel to the at least partial area of the outer surface of the first radiator 211. The second radiator 221 covers the at least partial area of the outer surface of the first radiator 211. Specifically, the second radiator 221 may cover the entire outer surface of the first radiator 211, or may cover a partial area of the outer surface of the first radiator 211.

In some embodiments, as shown in FIG. 9, an insulation material 23 is filled in a gap between the first radiator 211 and the second radiator 221. In this way, the first radiator 211 and the second radiator 221 may be supported by the insulation material 23, to keep a stable relative position between the first radiator 211 and the second radiator 221, so that structural stability of the antenna structure 2 provided in this embodiment of this application can be improved, and performance of the antenna structure 2 can be ensured.

The insulation material 23 may be filled in the gap between the first radiator 211 and the second radiator 221 by using a nano molding process.

In some embodiments, as shown in FIG. 9, a spacing d between the second radiator 221 and the first radiator 211 is 0 mm to 0.2 mm. In this way, the distance between the second radiator 221 and the first radiator 211 is close. This can reduce a thickness of the metal bezel. In addition, because a coating is generally disposed on an outer surface of the metal bezel, when the distance between the second radiator 221 and the first radiator 211 is close, the second radiator 221 can be packaged in the coating on the outer side of the first radiator 211.

Figure 10:
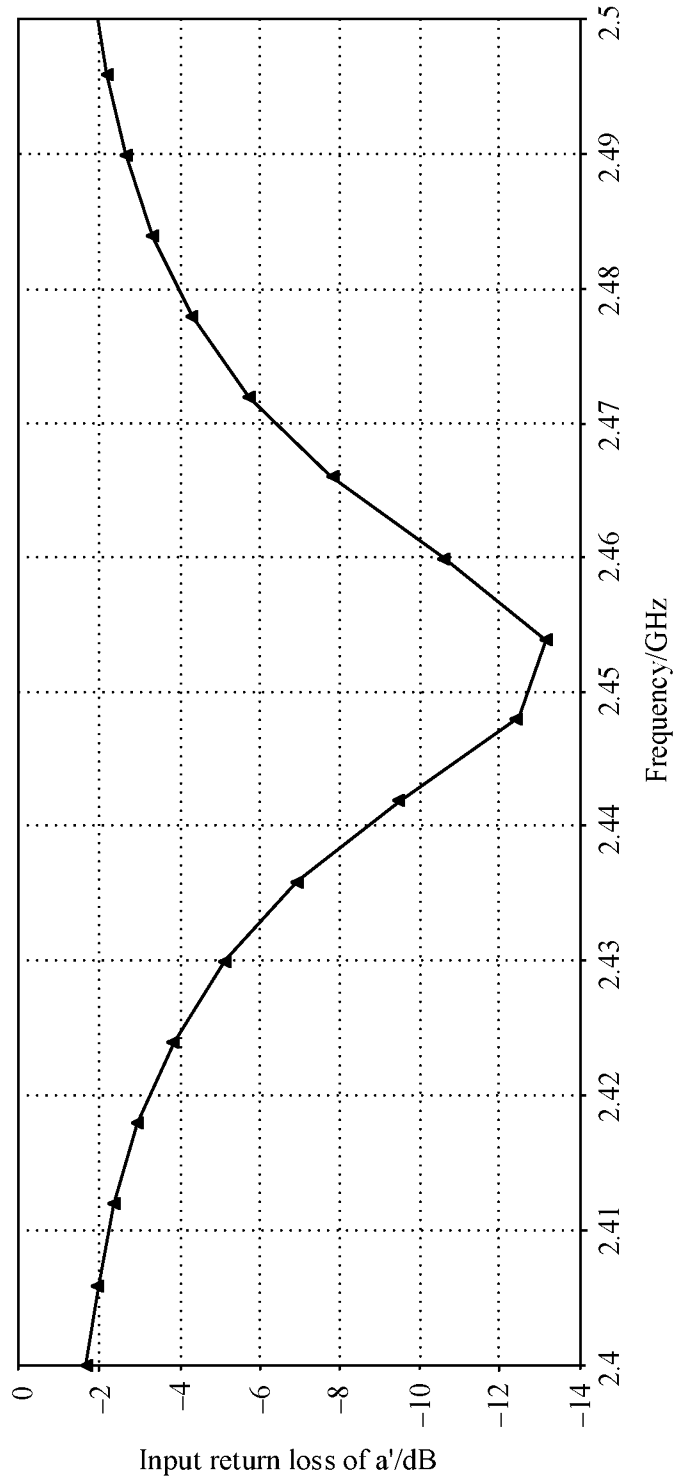
FIG. 10 shows an input return loss of a second feeding point a' in the antenna structure (including a shorting connector) shown in FIG. 9 within a frequency band of 2.4 GHz to 2.5 GHz.
Figure 11:
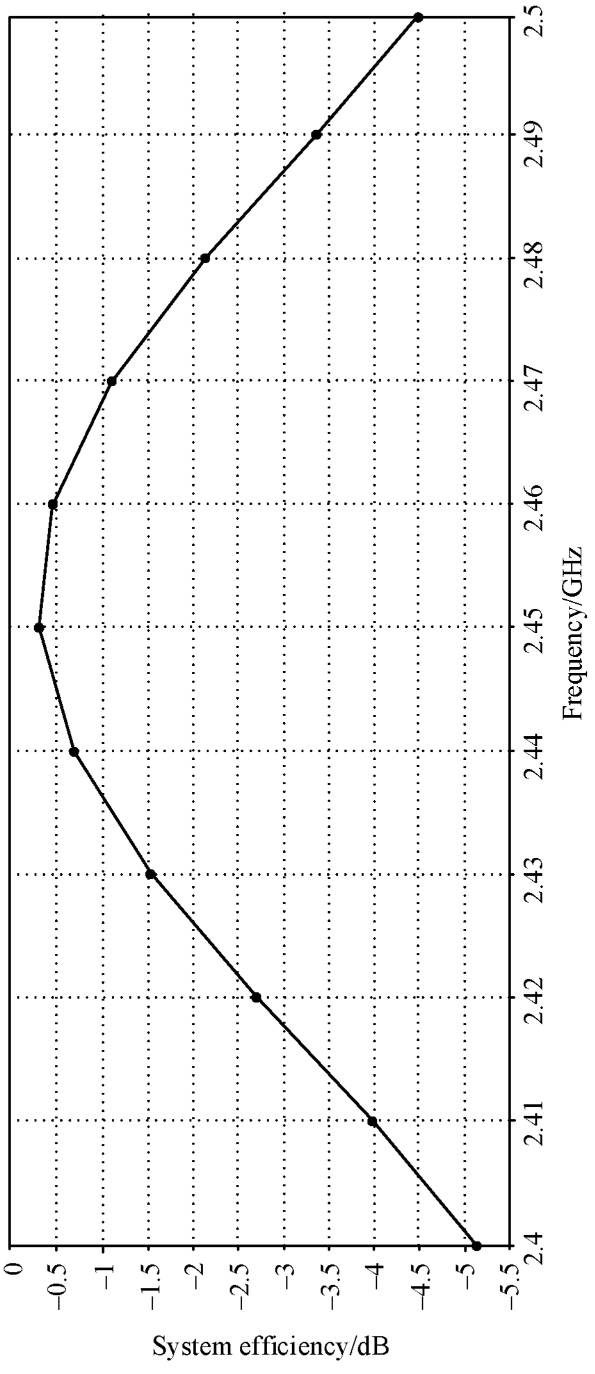
FIG. 11 shows system efficiency of a second antenna in the antenna structure (including a shorting connector) shown in FIG. 9 within a frequency band of 2.4 GHz to 2.5 GHz.
Figure 12:
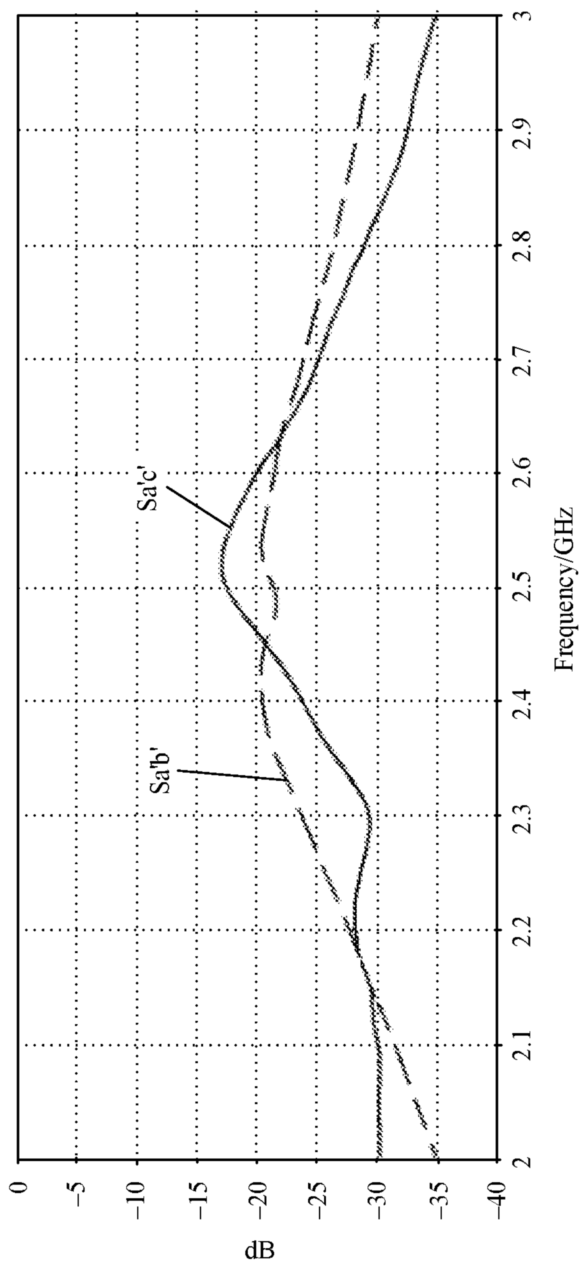
FIG. 12 shows isolation between a second feeding point a' and a first feeding point b' and isolation between the second feeding point a' and a first feeding point c' when the first feeding point b' and the first feeding point c' in the antenna structure (not including a shorting connector) shown in FIG. 9 are simultaneously matched to 2.45 GHz resonance.

An input return loss of the second feeding point a' in the antenna structure 2 (not including the shorting connector) shown in FIG. 8 and FIG. 9 within a frequency band of 2.4 GHz to 2.5 GHz is simulated, and a result is recorded in FIG. 10. In addition, system efficiency of the second antenna 22 in the antenna structure 2 (not including the shorting connector) shown in FIG. 8 and FIG. 9 within a frequency band of 2.4 GHz to 2.5 GHz is simulated, and a result is recorded in FIG. 11. It can be seen from FIG. 10 and FIG. 11 that a resonance frequency corresponding to the input return loss of the second feeding point a' is located at 2.454 GHz (shown in FIG. 10), and the system efficiency of the second antenna 22 within the frequency band of 2.4 GHz to 2.5 GHz is greater than −5 dB (shown in FIG. 11). The system efficiency is high, and can be used to transmit or receive a signal. When the first feeding point b' and the first feeding point c' in the antenna structure 2 (not including the shorting connector) shown in FIG. 8 and FIG. 9 are simultaneously matched to 2.45 GHz resonance, isolation Sa'b' between the second feeding point a' and the first feeding point b' and isolation Sa'c' between the second feeding point a' and the first feeding point c' are simulated, and a result is recorded in FIG. 12. It can be seen from FIG. 12 that both Sa'b' and Sa'c' are less than −17.5 dB, the isolation between the first antenna 21 and the second antenna 22 is high, and the first antenna 21 and the second antenna 22 can cover a same frequency band.

It should be noted that the antenna structure 2 in this embodiment of this application is not only used for a low-frequency antenna, but also used for a medium/high-frequency antenna, a wireless fidelity (wireless fidelity, Wi-Fi) antenna, a Sub6G antenna, and the like. The first antenna 21 in the antenna structure in this embodiment of this application is not limited to the metal bezel antenna, but may alternatively be a non-metal bezel antenna, for example, a flexible printed circuit (flexible printed circuit, FPC) antenna, a laser direct structuring (laser direct structuring, LDS) antenna, or a patch antenna.

In the descriptions of this specification, the specific features, structures, materials, or characteristics may be combined in a proper manner in any one or more of the embodiments or examples.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An electronic device comprising:
- an antenna structure comprising:
  - a signal reference ground;
  - a first antenna comprising:
    - a first feeding line comprising:
      - a first end; and
      - a second end coupled to a first feed for the antenna structure; and
    - a first radiator electrically coupled to the signal reference ground and comprising a first feeding point coupled to the first end, wherein the first radiator is fed from the first feeding point through the first feeding line; and
  - a second antenna comprising:
    - a second feeding line comprising:
      - a third end;
      - a fourth end coupled to a second feed for the antenna structure;
      - a signal transmission line; and
      - a signal reference ground line of the second antenna electrically coupled to the first radiator of the first antenna; and
    - a second radiator comprising a second feeding point coupled to the third end, wherein the second radiator is fed from the second feeding point through the second feeding line, wherein the second radiator of the second antenna is electrically coupled to the first radiator of the first antenna through the signal reference ground line of the second antenna, and wherein the first radiator is a reference ground to the second radiator through the signal reference ground line.

2. The electronic device of claim 1, wherein the second radiator is located on a first side of the first radiator that is away from the signal reference ground.

3. The electronic device of claim 2, wherein the second feed is located on a second side of the first radiator that is in proximity to the signal reference ground, wherein the first radiator further comprises a first through hole, wherein the first through hole comprises an inner wall that is electrically coupled to the signal reference ground line, and wherein the second feeding line is configured to penetrate through the first through hole.

4. The electronic device of claim 3, wherein the first radiator further comprises a grounding point, wherein the first through hole is located at the grounding point, wherein the first antenna further comprises a conductive connector, wherein the first radiator is electrically coupled to the signal reference ground through the conductive connector, and wherein the conductive connector comprises:

a fifth end coupled to the grounding point;

a sixth end coupled to the signal reference ground; and a second through hole coupled to the first through hole, wherein the second feeding line is configured to penetrate through the first through hole and the second through hole.

5. The electronic device of claim 2, wherein the second antenna further comprises a shorting connector comprising:

a fifth end coupled to the second radiator; and a sixth end coupled to the first radiator.

6. The electronic device of claim 2, wherein the second radiator is of a metal sheet structure and configured to cover a partial area of a surface of the first radiator that is away from the signal reference ground.

7. The electronic device of claim 1, wherein the second feeding line is one of the following:

a coaxial line and a microstrip.

8. An electronic device comprising:

a printed circuit board comprising a reference ground layer;

a metal bezel; and an antenna structure comprising:

a signal reference ground that is the reference ground layer;

a first antenna comprising:

a first feeding line comprising:

a first end; and a second end coupled to a first feed for the antenna structure; and a first radiator that is a part of the metal bezel and electrically coupled to the signal reference ground, wherein the first radiator comprises a first feeding point coupled to the first end, wherein the first radiator is fed from the first feeding point through the first feeding line; and a second antenna comprising:

a second feeding line comprising:

a third end;

a fourth end coupled to a second feed for the antenna structure;

a signal transmission line; and a signal reference ground line electrically coupled to the first radiator; and a second radiator located on an outer side of the first radiator, wherein an insulation material is filled in a gap between the first radiator and the second radiator, wherein the second radiator comprises a second feeding point coupled to the third end, and wherein the second radiator is fed from the second feeding point through the second feeding line.

9. The electronic device of claim 8, wherein the second feed is located on a first side of the first radiator that is in proximity to the signal reference ground, wherein the first radiator further comprises a first through hole comprising an inner wall that is electrically coupled to the signal reference ground line, and wherein the second feeding line is configured to penetrate through the first through hole.

10. The electronic device of claim 9, wherein the first radiator further comprises a grounding point, wherein the first through hole is located at the grounding point, wherein the first antenna further comprises a conductive connector, wherein the first radiator is electrically coupled to the reference ground layer through the conductive connector, and wherein the conductive connector comprises:

a fifth end coupled to the grounding point;

a sixth end coupled to the signal reference ground; and a second through hole coupled to the first through hole, wherein the second feeding line is configured to penetrate through the first through hole and the second through hole.

11. The electronic device of claim 8, wherein the second antenna further comprises a shorting connector comprising:

a fifth end coupled to the second radiator; and a sixth end coupled to the first radiator.

12. The electronic device of claim 8, wherein the second radiator is of a metal sheet structure and configured to cover a partial area of an outer surface of the first radiator.

13. The electronic device of claim 12, wherein a spacing between the second radiator and the first radiator is 0 millimeters (mm) to 0.2 mm.

14. The electronic device of claim 8, wherein the second feeding line is one of the following:

a coaxial line and a microstrip.

15. An antenna structure comprising:

a signal reference ground;

a first antenna comprising:

a first feeding line comprising:

a first end; and a second end coupled to a first feed for the antenna structure; and a first radiator electrically coupled to the signal reference ground and comprising a first feeding point coupled to the first end, wherein the first radiator is fed from the first feeding point through the first feeding line; and a second antenna comprising:

a second feeding line comprising:

a third end;

a fourth end coupled to a second feed for the antenna structure;

a signal transmission line; and a signal reference ground line of the second antenna electrically coupled to the first radiator of the first antenna; and a second radiator comprising a second feeding point coupled to the third end, wherein the second radiator is fed from the second feeding point through the second feeding line wherein the second radiator of the second antenna is electrically coupled to the first radiator of the first antenna through the signal reference ground line of the second antenna, and wherein the first radiator is a reference ground to the second radiator through the signal reference ground line.

16. The antenna structure of claim 15, wherein the second radiator is located on a first side of the first radiator that is away from the signal reference ground.

17. The antenna structure of claim 16, wherein the second feed is located on a second side of the first radiator that is in proximity to the signal reference ground, wherein the first radiator further comprises a first through hole, wherein the first through hole comprises an inner wall that is electrically coupled to the signal reference ground line, and wherein the second feeding line is configured to penetrate through the first through hole.

18. The antenna structure of claim 17, wherein the first radiator further comprises a grounding point, wherein the first through hole is located at the grounding point, wherein the first antenna further comprises a conductive connector, wherein the first radiator is electrically coupled to the signal reference ground through the conductive connector, and wherein the conductive connector comprises:

a fifth end coupled to the grounding point;

a sixth end coupled to the signal reference ground; and a second through hole coupled to the first through hole, wherein the second feeding line is configured to penetrate through the first through hole and the second through hole.

19. The antenna structure of claim 16, wherein the second antenna further comprises a shorting connector comprising:

a fifth end coupled to the second radiator; and a sixth end coupled to the first radiator.

20. The antenna structure of claim 16, wherein the second radiator is of a metal sheet structure and configured to cover a partial area of a surface of the first radiator that is away from the signal reference ground.

* * * * *